United States Patent
Murakami et al.

[15] 3,665,037
[45] May 23, 1972

[54] 4-METHYLCYLOHEXYLHYDROXY AMINE

[72] Inventors: Masuo Murakami, Tokyo; Masaru Iwanami, Kanagawa-ken; Kazuo Kubo; Kenji Sano, both of Saitama-ken; Masahiro Kochiya; Hideki Arima, both of Tokyo, all of Japan

[73] Assignee: Yamanouchi Pharmaceutical Co., Ltd., Tokyo, Japan

[22] Filed: June 27, 1969

[21] Appl. No.: 837,330

[30] Foreign Application Priority Data

July 6, 1968 Japan...................................43/46816
July 19, 1968 Japan...................................43/50579

[52] U.S. Cl..........................260/563 R, 260/566 A, 424/325
[51] Int. Cl..........................................................C07c 83/02
[58] Field of Search.................................................260/563

[56] References Cited

OTHER PUBLICATIONS

Ransbotyn et al. " Tetrahedron Letters" (1968) pp. 2,535–2,538.

Protiva " Chem. Abstracts" Vol. 54 (1960) p. 6,580a
Barber " Chem. Abstracts" Vol. 54 (1960) pp. 16,434–16,435.

*Primary Examiner*—Joseph Rebold
*Assistant Examiner*—D. R. Phillips
*Attorney*—Wenderoth, Lind & Ponack

[57] ABSTRACT

Novel cyclohexylamine derivatives of the formula

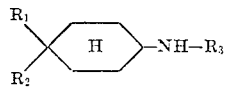

wherein $R_1$ represents a lower alkyl group, $R_2$ represents a hydrogen atom or a lower alkyl group, and $R_3$ represents a hydrogen atom or a hydroxyl group, said $R_3$ being a hydrogen atom when the $R_2$ is a lower alkyl group and a hydroxyl group when the $R_2$ is a hydrogen atom. These derivatives are excellent as analgesics.

1 Claims, No Drawings

4-METHYLCYLOHEXYLHYDROXY AMINE

This invention relates to certain compounds, some of which are novel, which are excellent as analgesics. More particularly, the invention relates to cyclohexylamine derivatives of the formula

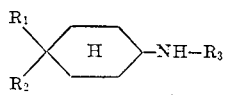

(I)

wherein $R_1$ represents a lower alkyl group, $R_2$ represents a hydrogen atom or a lower alkyl group, and $R_3$ represents a hydrogen atom or a hydroxyl groups, said $R_3$ being a hydrogen atom when the $R_2$ is a lower alkyl group and a hydroxyl group when the $R_2$ is a hydrogen atom, as well as non-toxic acid addition salts thereof.

The term "lower alkyl" as used herein means both straight and branched chain aliphatic hydrocarbon radicals having from one to five carbon atoms, such as methyl, ethyl, propyl, isopropyl, butyl, isobutyl, t-butyl, amyl, etc.

Hitherto a large number of compounds have been used as analgesics. However, there still remain some problems not solved since many of the compounds having strong analgetic effect, such as narcotic analgesics, often show strong toxicity and/or habituation.

Now, it has been found that the cyclohexylamine derivatives of the above formula (I) and their non-toxic acid addition salts of this invention have a strong analgetic effect and, nevertheless, are only slightly toxic.

As examples of the compounds of this invention, the following can be mentioned: trans-4-methylcyclohexyl hydroxylamine, trans-4-propylcyclohexyl hydroxylamine, 4,4-dimethylcyclohexylamine, 4-n-butyl-4-ethylcyclohexylamine, etc. and their non-toxic acid addition salts.

Those compounds of the formula (I) in which $R_2$ is a lower alkyl group and $R_3$ is a hydrogen atom, are prepared by reduction of a compound of the formula

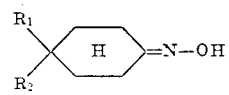

(II)

wherein $R_1$ and $R_2$ are same or different and each represents a lower alkyl group. The reduction can be performed (1) with an alkali metal in a lower alcohol, preferably with metallic sodium in ethanol, (2) catalytically with hydrogen in the presence as catalyst of Raney nickel, platinum or the like, (3) with lithium aluminum hydride, or (4) with sodium amalgam. The reaction may be carried out at either room temperature or an elevated temperature, depending on the reduction method employed.

On the other hand, the compounds of the formula (I) in which $R_2$ is a hydrogen atom and $R_3$ is a hydroxyl group, are prepared by reduction of a compound of the formula

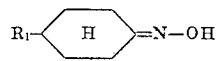

(III)

wherein $R_1$ represents a lower alkyl group. However, the reduction methods as mentioned above (as regards the compounds of the formula (II)) cannot be applied to the compounds of the formula (III) in that the group N—OH in the latter is reduced to an —NH$_2$ group. The desired compounds having —NJ—OH group are obtainable from the compounds of the formula (III) only by a special reduction method, i.e. the reduction with an alkali metal borohydride, preferably sodium borohydride, in an aqueous alcohol. The reaction progresses smoothly even at room temperature.

The reaction products thus formed can be separated from the reaction mixture and then purified, by conventional chemical procedures such as concentration, distillation, recrystallization, etc.

The products may be converted into their acid addition salts by a conventional method, before or after the separation from the reaction mixture.

Processes for the preparation of the compounds of this invention will be further illustrated by examples, later.

To demonstrate the improvements brought about by the compounds of this invention, a comparative test on the analgetic activity was effected between the compounds of this invention and a known typical analgesic—sulpyrin, and a known analogous compound having analgetic activity—N-ethyl-1-phenylcyclohexylamine hydrochloride (cf. U.S. Pat. No. 3,097,136; Cyclohexamine).

Experimental procedure:

The test was carried out in accordance with the method described by R. Koster et al. (Fed. Proc. 18., 412 (1959)).

The saline solution containing a compound to be tested at a prescribed concentration was administered by subcutaneous injection to a group of eight male mice (DD strain, each weighing from 14 to 20 g), in an amount of 10 ml per 1 kg of the body weight. To another group of eight mice, 10 ml (per 1 kg of the body weight) of simple saline solution were administered subcutaneously. At 45 and 90 minutes after the administration, 0.6 percent aqueous acetic acid solution was administered by intraperitoneal injection to each mouse of both the test group and the control group, in an amount of 10 ml per 1 kg of the body weight. Then, the number of struggles (i.e. exercises in bending and stretching of legs) was counted for a time period of 20 minutes subsequent to each of the twice intraperitoneal injections. The reduction rate (percent) of the number of struggles was computed according to the following equation:

$$\text{Reduction rate} = \frac{\text{Difference of the number of struggles between the test group and the control group (difference in the mean values obtained with eight mice for each group)}}{\text{Number of struggles of the control group (the mean value obtained with eight mice)}} \times 100$$

The results obtained are shown in the following table 1.

TABLE 1

| Compound tested | Dose (mg/kg) | Reduction rate of struggles | | Remarks |
| --- | --- | --- | --- | --- |
| | | 45 min. after | 90 min. after | |
| 4,4-Dimethylcyclo- | 3.4 | 55.6 | 65.0 | Compound of Ex. 2 |
| hydrochloride 4-Methylcyclohexyl-hydroxylamine hydrochloride Compound xylamine | 6.7* | 90.6 | 76.7 | |
| hydrochloride | 6.8* | 46.0 | 43.6 | Compound of Ex. 1 |
| Sulpyrine | 28.3** | 19.2 | 5.8 | Known analgesic |
| Cyclohexamine | 17.4** | 94.0 | 15.0 | Known compound |

* The two compounds were used in the same molar amount.

** These compounds were used in the double molar amount as compared with the compounds of this invention, so that their relatively weak effect may be observed distinctly.

As can be seen from the table 1, the compounds of this invention have an excellent analgetic effect which lasts long. Although the analgetic effect of cyclohexamine is strong at 45 minutes after the administration, the effect diminishes significantly at 90 minutes after the administration and does not last so long. Moreover, the mice to which cyclohexamine was administered showed a transitory abnormal behavior on its injection, which could not be observed on the injection of the compounds of this invention.

The toxicity of the compounds of this invention was tested on mice, using as their representatives 4,4-dimethylcyclohexylamine and 4-methylcyclohexylhydroxylamine. The compound was administered to a group of male mice (DD strain, each weighing from 18 to 20g.), and the mice were observed for 7 days. All the animals survived without any abnormal symptom, and no histological changers were found on their autopsy. Thus, the compounds of this invention were proved to be non-toxic.

The compounds of this invention are usually administered orally as a preparation in the form, for example, of tablets, powder, capsules, etc., or parenterally as a preparation in the form, for example, of injections for intraperitoneal or subcutaneous use. For the oral administration, however, an enteric coating preparation is preferred.

The clinical dose of the compounds of this invention for an adult is usually within the range from 0.09 to 1.6 g per day orally, and from 0.03 to 0.8 g per day parenterally. The daily dose is administered being divided into two or three portions, at proper intervals. The dose may vary depending on the age and physical condition of the patient.

The following examples will serve to illustrate the present invention without limiting it thereto.

EXAMPLE 1

In the mixture of 10 ml of ethanol and 5 ml of distilled water was dissolved 1.0 g of 4-methylcyclohexanone oxime, and to the resulting solution was gradually added 0.4 g of sodium borohydride. The reaction mixture was stirred for 5 hours at room temperature, acidified with 10 percent aqueous hydrochloric acid, and then adjusted at pH 4 with 10 percent aqueous sodium hydroxide solution. The starting material unreacted was removed from the mixture by extraction with ether. The aqueous layer was made alkaline with 10 percent aqueous sodium hydroxide solution, and then extracted with ether. The ether extract so obtained was dried over magnesium sulfate, and then the ether was distilled off. The product was treated with alcoholic hydrochloric acid to give 0.3 g of trans-4-methylcyclohexylhydroxylamine hydrochloride having a melting point of 136° to 138°C. On nuclear magnetic resonance absorption spectrum of this product, the hydrogen atom bound to the carbon atom to which the hydroxylamino group is bound gives 7 : 7.30 (CDCl$_3$) (1H).

Elementary analysis as $C_7H_{16}NOCl$

|  | C (%) | H (%) | N (%) |
|---|---|---|---|
| Calculated: | 50.75 | 9.74 | 8.46 |
| Found: | 50.47 | 9.64 | 8.46 |

EXAMPLE 2

In 3.6 ml of ethanol were dissolved 1.8 g of 4,4-dimethylcyclohexanone, and to the resulting solution were added 7.2 ml of water containing 2.5 g of hydroxylamine hydrochloride dissolved therein. The reaction mixture was adjusted at pH 6.9 with 35 percent aqueous solution of sodium carbonate while stirring at room temperature, and then the stirring was continued for 2 hours. The oily precipitates formed were taken into ether. The ether solution was dried over magnesium sulfate, and then the ether was distilled off to give 2.0 g of an oily product, 4,4-dimethylcyclohexanone oxime.

The product thus obtained was dissolved in 40 ml of hot absolute ethanol, and the resulting solution was heated to keep its boiling. To the boiling solution were added portionwise 5.0 g of metallic sodium during 15 minutes, and then the reaction mixture was refluxed for 30 minutes. After cooling, the reaction mixture was adjusted at pH 7.5 with 6N hydrochloric acid and concentrated under reduced pressure. Then, the concentrate was adjusted at pH 11.5 with sodium hydroxide whereby oily precipitates were obtained. The oily precipitates were taken into ether, and the ether solution was concentrated under pressure and further distilled in vacuo to give 1.3 g of 4,4-dimethylcyclohexylamine having a boiling point of 67°-69 °C (at 20 mm Hg). Yield: 72 percent.

0.6 gram of the product waS dissolved in 50 ml of ether, and to the resulting solution was introduced hydrogen chloride gas to precipitate crystals. The crystals were separated by filtration and recrystallized from a mixture of alcohol and ether, whereby 0.6 g of 4,4-dimethylcyclohexylamine hydrochloride was obtained as needle crystals.

Elementary analysis as $C_8H_{17}NCl$

|  | C (%) | H (%) | N (%) | Cl (%) |
|---|---|---|---|---|
| Calculated: | 58.70 | 11.08 | 8.56 | 21.7 |
| Found: | 58.34 | 10.94 | 8.59 | 20.9 |

EXAMPLE 3

3 grams of 4,4-dimethylcyclohexanone oxime, 20 ml of methanol saturated with ammonia and 3 g of Raney nickel were introduced into an autoclave. The hydrogenation was performed for 2 hours at room temperature, with an initial hydrogen pressure of 30 kg/cm$^2$. The Raney nickel was separated by filtration from the reaction mixture. The filtrate was concentrated to remove ammonia and methanol, and then distilled in vacuo to give 2.3 g of the oily final product having a boiling point of 66°-68°C (at 20 mm Hg). Yield: 84 percent.

EXAMPLE 4

In 15 ml of acetic acid were dissolved 3.5 g of 4,4-dimethylcylohexanone oxime, and to the resulting solution was added 0.15 g of platinum black. The hydrogenation was performed for 4 hours at room temperature. The platinum black was removed by filtration from the reaction mixture, and the filtrate was concentrated under reduced pressure to remove the acetic acid. To the residue obtained were added water and ether to take impurities into ether. The aqueous mother liquor was alkalified strongly with 40 percent aqueous solution of sodium hydroxide. The floated oily product was taken into ether, and the ether solution was dried over anhydrous potassium carbonate. The ether was distilled off, and the residue obtained was distilled in vacuo to give 2.55 g of the oily final product having a boiling point of 67°-69°C (at 20 mm Hg). Yield: 81 percent.

EXAMPLE 5

In 40 ml of absolute ether were added 1.5 g of lithium aluminum hydride, and to the resulting solution were added dropwise 10 ml of ether containing 2.8 g of 4,4-dimethylcyclohexanone oxime dissolved therein, while stirring. The mixture was refluxed for 3 hours. After cooling, the reaction mixture was acidified with diluted sulfuric acid. Then, the ether layer was removed from the mixture, and the aqueous layer was made strongly alkaline with 40 percent aqueous solution of sodium hydroxide. The floated oily product was taken into ether, and the ether solution was dried over anhydrous potassium carbonate. The ether was distilled off, and the residue obtained was distilled in vacuo to give 1.6 g of the oily final product having a boiling point of 66°-69°C (at 20 mm Hg). Yield: 63.5 percent.

EXAMPLE 6

In 30 ml of ethanol were dissolved 2.1 g of 4,4-dimethylcyclohexanone oxime, and to the resulting solution were added 71 g of 2.5 percent sodium amalgam. The reaction mixture was stirred for 1 hour and then acidified gradually by adding 4.7 g of acetic acid dropwise. The precipitated mercury was removed by filtration, and then the ethanol in the filtrate was distilled off under reduced pressure. To the residue obtained were added water and ether. After the separation of the ether layer, the aqueous layer was made alkaline with 40 percent aqueous solution of sodium hydroxide. The floated oily product was taken into ether, and the ether solution was dried over anhydrous potassium carbonate. The ether was distilled off, and the residue obtained was distilled in vacuo to give 1.35 g of the oily final product having a boiling point of 66°–69 °C (at 20 mm Hg). Yield: 71.3 percent.

EXAMPLE 7

To 25 ml of water containing 8.5 g of hydroxylamine hydrochloride and 10 g of anhydrous sodium acetate dissolved therein were added 18.6 g of 4-n-butyl-4-ethylcyclohexanone, and to the resulting solution was added methanol to homogenize it. The reaction mixture was allowed to stand for 30 minutes at room temperature, and then concentrated under reduced pressure. To the residue thus obtained was added water, whereby an oily product precipitated. The oily product was extracted with ether, and the ether extract was washed with 10 percent aqueous solution of sodium carbonate. After drying over magnesium sulfate, the ether was distilled off under reduced pressure, and the residue obtained was distilled in vacuo to give 17.8 g of 4-n-butyl-4-ethyl-cyclohexanone oxime having a boiling point of 140° to 144°C (at 5 mm Hg).

The product was dissolved in 150 ml of absolute ethanol, and to the solution were added portionwise 14 g of metallic sodium while keeping its gentle boiling. After cooling, the reaction mixture was acidified with 6N hydrochloric acid and concentrated under reduced pressure. Then, the concentrate was made strongly alkaline with 40 percent aqueous solution of sodium hydroxide to precipitate an oily product. The latter was extracted with ether, and the ether extract was first dried over potassium carbonate and then concentrated under reduced pressure to remove the ether. The residue thus obtained was distilled in vacuo to give 7.6 g of 4-n-butyl-4-ethyl-cyclohexylamine having a boiling point of 109° to 111°C (at 8 mm. Hg).

The product was converted to 4-n-butyl-4-ethylcyclohex-ylamine hydrochloride having a melting point of 219°C, by treating it with alcoholic hydrochloric acid.

Elementary analysis as $C_{12}H_{26}NCl$

| | C (%) | H (%) | N (%) |
|---|---|---|---|
| Calculated: | 65.57 | 11.92 | 6.37 |
| Found: | 65.59 | 11.95 | 6.37 |

EXAMPLE 8

In 20 ml of ethanol were dissolved 2.6 g of 4-propyl-cyclohexanone oxime, and to the resulting solution was added 0.8 g of sodium borohydride. The reaction mixture was stirred for 4 hours at room temperature, and then acidified with 10 percent aqueous hydrochloric acid. The starting material unreacted was removed from the reaction mixture by extraction with ether. The aqueous layer separated was made alkaline with 10 percent aqueous solution of sodium hydroxide, and then extracted with ether. The ether extract was dried over potassium carbonate and concentrated under reduced pressure. The residue thus obtained was treated with alcoholic hydrochloric acid to give 0.5 g of 4-propylcyclohexylhydroxylamine hydrochloride having a melting point of 146° to 148°C.

Elementary analysis as $C_9H_{20}NOCl$

| | C (%) | H (%) | N (%) |
|---|---|---|---|
| Calculated: | 55.80 | 10.41 | 7.23 |
| Found: | 55.68 | 10.18 | 7.16 |

EXAMPLE 9

Preparation of tablets

Prescription:
| | |
|---|---|
| Trans-4-methylcyclohexylhydroxylamine | 1.5g |
| Microcrystalline cellulose | 0.6g |
| Starch | 0.3g |
| Talc | 0.1g |

The whole was made into 30 tablets. The tablets were formed on a ⅛ inch deep cup punch. They may be coated according to the conventional method, if desired.

EXAMPLE 10

Preparation of injections

In 100 ml of saline solution were dissolved 2 g of 4,4-dimethylcyclohexylamine, and the solution thus formed was aseptically divided by 1 ml into 100 ampoules each containing 20 mg of the active compound.

What is claimed is:
1. 4-methylcyclohexylhydroxylamine.

* * * * *